US010334815B1

(12) United States Patent
Edmonds

(10) Patent No.: US 10,334,815 B1
(45) Date of Patent: Jul. 2, 2019

(54) ANIMAL ENCLOSURE

(71) Applicant: Edmonds Outdoors, LLC, Brentwood, TN (US)

(72) Inventor: Addison Edmonds, Brentwood, TN (US)

(73) Assignee: Edmonds Outdoors, LLC, Brentwood, TN (US)

( * ) Notice: Subject to any disclaimer, the term of this patent is extended or adjusted under 35 U.S.C. 154(b) by 204 days.

(21) Appl. No.: 15/291,048

(22) Filed: Oct. 11, 2016

Related U.S. Application Data

(63) Continuation-in-part of application No. 29/535,995, filed on Aug. 12, 2015, now Pat. No. Des. 768,941.

(51) Int. Cl.
*A01K 1/00* (2006.01)
*B62B 1/24* (2006.01)

(52) U.S. Cl.
CPC .............. *A01K 1/0035* (2013.01); *B62B 1/24* (2013.01)

(58) Field of Classification Search
CPC ............ A01K 1/0035; B60P 3/04; B62B 1/24
USPC ................................................. 119/496, 497
See application file for complete search history.

(56) References Cited

U.S. PATENT DOCUMENTS

| 138,111 | A | * | 4/1873 | Adriaans | ................... | B62B 1/24 |
| | | | | | | 298/2 |
| 823,544 | A | * | 6/1906 | Parker | .................. | A01K 1/0245 |
| | | | | | | 119/453 |
| 1,020,349 | A | * | 3/1912 | Havard | ..................... | B62B 1/24 |
| | | | | | | 280/29 |
| 2,217,871 | A | * | 10/1940 | Lindgren | .................. | B62B 1/24 |
| | | | | | | 293/1 |
| 2,313,591 | A | * | 3/1943 | Slaughter | .................. | B62B 1/24 |
| | | | | | | 280/47.17 |

(Continued)

FOREIGN PATENT DOCUMENTS

| CN | 2764148 Y | 3/2006 |
| CN | 102037899 A | 5/2011 |

(Continued)

OTHER PUBLICATIONS

"Alumni Profile: Addison Edmonds". Found on line Jun. 22, 2016 at olemissalumni.com. Page dated Mar. 1, 2015. Retrieved from http://www.olemissalumni.com/alumni-profile-addison-edmonds/.

(Continued)

*Primary Examiner* — Magdalena Topolski
*Assistant Examiner* — Morgan T Barlow
(74) *Attorney, Agent, or Firm* — Waller Lansden Dortch & Davis, LLP; Matthew C. Cox

(57) ABSTRACT

An animal enclosure for housing or transporting an animal such as a dog includes a kennel body having a top side, a bottom side opposite the top side, a front side, a back side opposite the front side, a right side and a left side opposite the right side. The animal enclosure includes a lower rear edge at the intersection between the back side and the bottom side. First and second wheels are passively disposed along the lower rear edge when the animal enclosure is in a resting position. A user can move the animal enclosure by lifting up the front edge of the kennel body, causing the first and second wheels to engage a surface on which the kennel rests. Once the wheels are engaged, a user may then maneuver the kennel in a tilted position using the first and second wheels as a rolling fulcrum.

6 Claims, 11 Drawing Sheets

(56) References Cited

U.S. PATENT DOCUMENTS

| | | | |
|---|---|---|---|
| 2,464,709 A * | 3/1949 | Orsini | B62B 1/24 298/17 R |
| 2,544,505 A * | 3/1951 | Kronhaus | B62B 1/24 280/47.31 |
| 2,790,414 A * | 4/1957 | Rossow | A01K 1/0245 119/497 |
| 3,536,044 A | 10/1970 | Stephens | |
| 3,724,025 A | 4/1973 | Hicks | |
| 3,785,344 A * | 1/1974 | Patterson | A01K 1/03 119/453 |
| 4,016,833 A | 4/1977 | Ray | |
| 4,090,472 A * | 5/1978 | York | A01K 3/005 119/502 |
| 4,339,147 A * | 7/1982 | Kimzey | B60P 3/04 119/415 |
| 4,525,952 A | 7/1985 | Cunningham et al. | |
| 4,561,526 A * | 12/1985 | Winter | A45C 13/262 16/113.1 |
| 4,575,109 A * | 3/1986 | Cowdery | A45C 5/00 190/18 A |
| 4,696,259 A | 9/1987 | Fewox | |
| 4,852,520 A | 8/1989 | Goetz | |
| 4,917,047 A | 4/1990 | Wazeter, III | |
| D308,429 S | 6/1990 | VanSkiver | |
| D308,588 S | 6/1990 | Goetz | |
| D312,333 S | 11/1990 | Van Skiver | |
| D314,251 S | 1/1991 | Van Skiver | |
| 5,154,137 A | 10/1992 | Stanaland | |
| 5,154,265 A * | 10/1992 | Capistrant | A45C 5/146 16/34 |
| 5,168,829 A | 12/1992 | Dietrich | |
| D334,087 S | 3/1993 | Goetz | |
| 5,220,882 A | 6/1993 | Jenkins | |
| 5,253,612 A * | 10/1993 | Goetz | A01K 1/0245 119/496 |
| D351,688 S | 10/1994 | Northrop et al. | |
| 5,357,900 A | 10/1994 | Ho | |
| D352,573 S | 11/1994 | Sampson et al. | |
| 5,373,708 A * | 12/1994 | Dumoulin, Jr. | A45C 5/146 280/30 |
| 5,467,734 A * | 11/1995 | Ho | A01K 1/0236 119/496 |
| 5,669,331 A | 9/1997 | Richmond | |
| 5,701,843 A * | 12/1997 | Lazides | A01K 1/0245 119/496 |
| 5,727,503 A | 3/1998 | Whittaker | |
| 5,911,763 A | 6/1999 | Quesada | |
| 5,931,120 A * | 8/1999 | Burns | A01K 1/0254 119/497 |
| 5,934,425 A * | 8/1999 | Sadow | A45C 13/262 16/408 |
| 6,021,740 A * | 2/2000 | Martz | A01K 1/0254 119/482 |
| D426,680 S | 6/2000 | Morley | |
| 6,095,088 A | 8/2000 | Savicki | |
| 6,223,691 B1 * | 5/2001 | Beattie | A01K 1/0236 119/453 |
| 6,230,656 B1 * | 5/2001 | Walach | A01K 1/0236 119/453 |
| D445,222 S | 7/2001 | Ross | |
| 6,345,591 B1 | 2/2002 | Richmond | |
| 6,427,631 B1 | 8/2002 | Ross | |
| 6,446,577 B1 | 9/2002 | Salahor | |
| D470,628 S | 2/2003 | Kinder et al. | |
| D471,676 S | 3/2003 | Kinder et al. | |
| 6,571,740 B1 | 6/2003 | Kinder et al. | |
| 6,698,812 B1 * | 3/2004 | Stubbs | B60P 3/04 119/400 |
| 6,732,676 B1 * | 5/2004 | Smith | A01K 1/0245 119/496 |
| 6,766,769 B1 * | 7/2004 | Doyle | A01K 1/0281 119/496 |
| 6,840,193 B2 | 1/2005 | Kost et al. | |
| 7,025,394 B1 | 4/2006 | Hunt | |
| 7,036,458 B1 | 5/2006 | Stornant | |
| 7,044,083 B2 | 5/2006 | Farmer et al. | |
| 7,070,190 B2 * | 7/2006 | Sadow | A45C 7/0045 16/110.1 |
| 7,090,242 B1 * | 8/2006 | Sheinall | A01K 1/0236 119/496 |
| D529,666 S | 10/2006 | Simpson et al. | |
| 7,152,554 B2 * | 12/2006 | Crawford | A01K 1/0245 119/496 |
| D538,942 S | 3/2007 | Grundy | |
| D545,507 S | 6/2007 | Harper et al. | |
| D546,005 S | 7/2007 | Harper et al. | |
| 7,261,060 B1 * | 8/2007 | Garofola | A01K 1/0236 119/482 |
| D551,399 S | 9/2007 | Harper et al. | |
| D555,292 S | 11/2007 | Harper et al. | |
| 7,322,315 B2 | 1/2008 | Brewer et al. | |
| 7,334,802 B2 * | 2/2008 | Kaplan | A45C 9/00 108/14 |
| D566,907 S * | 4/2008 | Barca | D30/109 |
| D571,053 S | 6/2008 | Donnelly | |
| D571,054 S | 6/2008 | Donnelly | |
| D574,559 S | 8/2008 | You et al. | |
| D583,108 S | 12/2008 | Richardson | |
| D584,458 S | 1/2009 | You et al. | |
| D611,201 S | 3/2010 | Jakubowski et al. | |
| D611,202 S | 3/2010 | Jakubowski et al. | |
| D615,251 S | 5/2010 | Scherbing | |
| D617,958 S | 6/2010 | Benincasa et al. | |
| 7,802,540 B2 | 9/2010 | Jakubowski et al. | |
| 8,127,715 B2 | 3/2012 | Leung | |
| 8,127,719 B2 | 3/2012 | Jakubowski et al. | |
| 8,132,537 B2 | 3/2012 | Trunnell et al. | |
| D659,294 S | 5/2012 | Veness et al. | |
| D671,691 S | 11/2012 | Neilan | |
| 8,336,500 B1 | 12/2012 | Britt | |
| D680,696 S | 4/2013 | Hammel | |
| 8,408,416 B2 | 4/2013 | Cheng-Lung et al. | |
| 8,413,472 B2 | 4/2013 | Chiang | |
| D692,621 S | 10/2013 | Ganahl | |
| 8,544,417 B2 | 10/2013 | Sangl et al. | |
| D696,473 S | 12/2013 | Ganahl | |
| 8,613,260 B2 | 12/2013 | Veness | |
| D703,876 S | 4/2014 | Chance et al. | |
| 8,733,292 B2 | 5/2014 | Nichols | |
| 8,757,095 B2 | 6/2014 | Farmer et al. | |
| D713,099 S | 9/2014 | Chance et al. | |
| D717,005 S | 11/2014 | Skaggs | |
| D720,503 S | 12/2014 | Lloyd | |
| 9,095,120 B1 | 8/2015 | Skaggs | |
| 9,119,375 B2 | 9/2015 | Flannery et al. | |
| 9,370,165 B2 | 6/2016 | De Bien | |
| 9,392,766 B1 * | 7/2016 | Elden | A01K 1/0035 |
| D768,941 S | 10/2016 | Edmonds | |
| D808,596 S | 1/2018 | Veness | |
| D822,912 S | 7/2018 | Edmonds | |
| D823,544 S | 7/2018 | Nguyen | |
| D827,211 S | 8/2018 | Cronkhite | |
| D827,212 S | 8/2018 | Cronkhite | |
| D833,085 S | 11/2018 | Edmonds | |
| 2002/0113389 A1 * | 8/2002 | Robinson | B62B 1/20 280/47.31 |
| 2004/0016409 A1 | 1/2004 | Schwinghammer et al. | |
| 2004/0026935 A1 | 2/2004 | Tang | |
| 2004/0065270 A1 * | 4/2004 | King | A01K 1/0236 119/496 |
| 2004/0134444 A1 | 7/2004 | Shiever et al. | |
| 2004/0194723 A1 | 10/2004 | Farmer et al. | |
| 2005/0103279 A1 | 5/2005 | Brewer et al. | |
| 2005/0241593 A1 * | 11/2005 | Kaura | A01K 1/0035 119/496 |
| 2005/0284399 A1 | 12/2005 | Asma | |
| 2006/0048716 A1 * | 3/2006 | Garofola | A01K 1/0236 119/453 |
| 2006/0169218 A1 * | 8/2006 | Chang | A01K 1/0236 119/496 |

(56) References Cited

U.S. PATENT DOCUMENTS

| | | | |
|---|---|---|---|
| 2007/0056524 A1* | 3/2007 | Barca | A01K 1/0245 119/496 |
| 2007/0157890 A1* | 7/2007 | Kaura | A01K 1/0088 119/496 |
| 2007/0278755 A1* | 12/2007 | Jack | A47B 81/00 280/37 |
| 2008/0022938 A1* | 1/2008 | Callan | A01K 1/0107 119/165 |
| 2008/0245313 A1 | 10/2008 | Jakubowski et al. | |
| 2009/0011210 A1 | 1/2009 | Gao et al. | |
| 2009/0101075 A1 | 4/2009 | Matlack | |
| 2009/0205578 A1* | 8/2009 | Alves | A01K 1/0107 119/454 |
| 2009/0223461 A1 | 9/2009 | Trunnell et al. | |
| 2010/0043720 A1 | 2/2010 | Yelverton | |
| 2010/0066041 A1* | 3/2010 | Metzger | B60P 1/027 280/6.153 |
| 2010/0192870 A1 | 8/2010 | Wood | |
| 2010/0282179 A1 | 11/2010 | Ho | |
| 2011/0220033 A1 | 9/2011 | Sangl et al. | |
| 2012/0037083 A1 | 2/2012 | Greene | |
| 2013/0055962 A1 | 3/2013 | Scoggins | |
| 2013/0220231 A1 | 8/2013 | Hovsepian | |
| 2013/0233250 A1 | 9/2013 | Veness et al. | |
| 2014/0083366 A1 | 3/2014 | Veness | |
| 2014/0137483 A1* | 5/2014 | Tong | E04H 1/12 52/2.11 |
| 2014/0216356 A1 | 8/2014 | Glover et al. | |
| 2015/0034018 A1 | 2/2015 | Edmonds | |
| 2015/0125250 A1* | 5/2015 | Sindlinger | A01K 1/0035 414/800 |
| 2016/0192614 A1* | 7/2016 | Hawk | A01K 1/0236 119/497 |
| 2016/0192615 A1 | 7/2016 | Pamess | |

FOREIGN PATENT DOCUMENTS

| | | | | | |
|---|---|---|---|---|---|
| FR | 2496401 A1 | * | 6/1982 | | A01K 1/0035 |
| FR | 2815817 A1 | * | 5/2002 | | A01K 1/0035 |
| FR | 2974972 A1 | * | 11/2012 | | A01K 1/0035 |
| GB | 503104 A | * | 3/1939 | | B60P 3/04 |
| GB | 1260572 A | * | 1/1972 | | B62B 1/24 |
| WO | 9918317 A1 | | 4/1999 | | |
| WO | 2015021053 A1 | | 2/2015 | | |

OTHER PUBLICATIONS

"Dog Crate Door: How We Made it Stronger and Escape-Proof". Found on line Jun. 22, 2016 at gunnerkennels.com. Page dated Apr. 10, 2015. Retrieved from https ://www .gun nerken nels.com/blog/dog-crate-door-how-we-made-it-stronger-and-scape-proof.

"Gunnar Kennel". Found on line Jun. 22, 2016 at youtube.com. Page dated May 14, 2015. Retrieved from https://www.youtube.com/watch?v=zoM Mv An hu30.

"Pet Travel Carvers and Crates-Crash Test Results". Found on line Jun. 22, 2016 at gopetfriendlyblog.com. Page dated 0713012015. Retrieved from http://www.gopetfriendlyblog.com/pet-travel-carriers-and-crates-crash-test-resu lts/.

U.S. Appl. No. 29/492,682, filed Jun. 2, 2014, Edmonds.

U.S. Appl. No. 29/539,652, filed Sep. 16, 2016, Edmonds.

PCT/US2014/049800, International Search Report, dated Nov. 21, 2014, 13 pages.

"ArcticShield Kennel Covers." Found online Apr. 11, 2018 at www.youtube.com. Page dated Jul. 14, 2015. Retrieved from URL: https://www.youtube.com/watch?v=R3XSN-cPQSE (Year: 2015).

"Mud River Dixie Kennel Cover." Found online Apr. 11, 2018 at www.amazon.com. Page dated Dec. 13, 2014. Retrieved from URL: https://goo.gl/XBrdqZ (Year: 2014).

"Classic Accessories Insulated Dog Kennel Jacket." Found on line Apr. 11, 2018 atwww.amazon.com. Page dated 0710212010. Retrieved from URL: https://www.amazon.com/classic-accessories-insulated-kennel-realtree/dp/b000pd8cck (Year: 2010).

\* cited by examiner

ANIMAL ENCLOSURE

CROSS-REFERENCE TO RELATED APPLICATION

This application is a continuation-in-part of and claims priority to co-pending U.S. patent application Ser. No. 29/535,995 filed Aug. 12, 2015 entitled ANIMAL ENCLOSURE, which is herein incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND

The present invention relates generally to structures for housing animals and more particularly to portable pet kennels and pet crates. In some embodiments, the present invention relates to portable pet crates for housing or transporting dogs.

Various types of structural enclosures for storing and transporting animals are known in the art. Conventional portable animal crates such as those used for housing and transporting dogs typically include a plastic or metal wire construction and include an interior enclosure with a selectively openable door. Conventional portable animal crates generally include a single-layer construction such as a single layer of plastic, metal or wire mesh. The single-layer material forms the structural support and also defines the enclosure space within the interior of the crate. Conventional single-layer animal crates of this type are generally sized to easily fit in the bed of a truck or the cargo area of a sport-utility vehicle, and such crates are often used by sportsmen, disabled persons, rescue, military and/or law enforcement personnel for storing and transporting dogs. Such conventional portable animal crates provide a benefit of being relatively lightweight and portable such that a single person can lift and move the crate. Additionally, these types of conventional animal crates are generally sized to accommodate only the animal or animals to be housed within, thereby enhancing the portable nature of the product.

One problem with conventional single-layer portable animal crates is the lack of structural integrity and toughness of construction. A single-layer material wall may easily deflect or buckle under a load, potentially harming the animal housed within the enclosure. For example, owners of portable animal crates may regularly move the crate between a house and a vehicle or other location. During repeated movement of the crate, conventional single-layer animal crates may be inadvertently dropped or impacted resulting in cracks or dents in the material. Also, while travelling in a vehicle, conventional portable single-layer animal crates may be crushed or severely deformed during a vehicle accident or other impact. Such deformation may severely injure or kill the animal housed within the enclosure.

Additionally, conventional animal crates having single-layer material walls provide little insulation to animals housed within the enclosure in cold weather, especially when transported in an exposed environment such as the bed of a pickup truck. Such conditions are frequently experienced by sportsmen when transporting sporting dogs during winter hunting seasons. To overcome this problem, users of such conventional single-walled animal crates are often forced to cover the crate with an insulating blanket or crate cover when transporting an animal in cold weather. However, conventional crate covers and blankets are expensive, cumbersome, may become torn or ripped, and further may be blown off the crate or become misaligned during use.

Another problem with conventional portable animal crates is the difficulty in moving the crate. For example, users may wish to move a crate between rooms in a residence, or into and out of a vehicle. Conventional portable animal crates, especially those for housing large dogs, are bulky and cumbersome to move. Such crates are also heavy and may be difficult to lift for moving any significant distances.

Others have attempted to overcome the difficulties of moving animal crates by providing crates with wheels. However, conventional devices including wheels are configured such that the wheels protrude from the bottom of the kennel body causing the overall size of the enclosure to be much taller. Other conventional devices with wheels on the bottom of the animal enclosure are cumbersome to lock the wheels, or allow unintended rolling motion that can endanger an animal inside the enclosure.

What is needed, then, are improvements to animal enclosures to address these and other problems.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a

Numerous other objects, advantages and features of the present disclosure will be readily apparent to those of skill in the art upon a review of the following drawings and description of a preferred embodiment.

DETAILED DESCRIPTION

Figure 1:
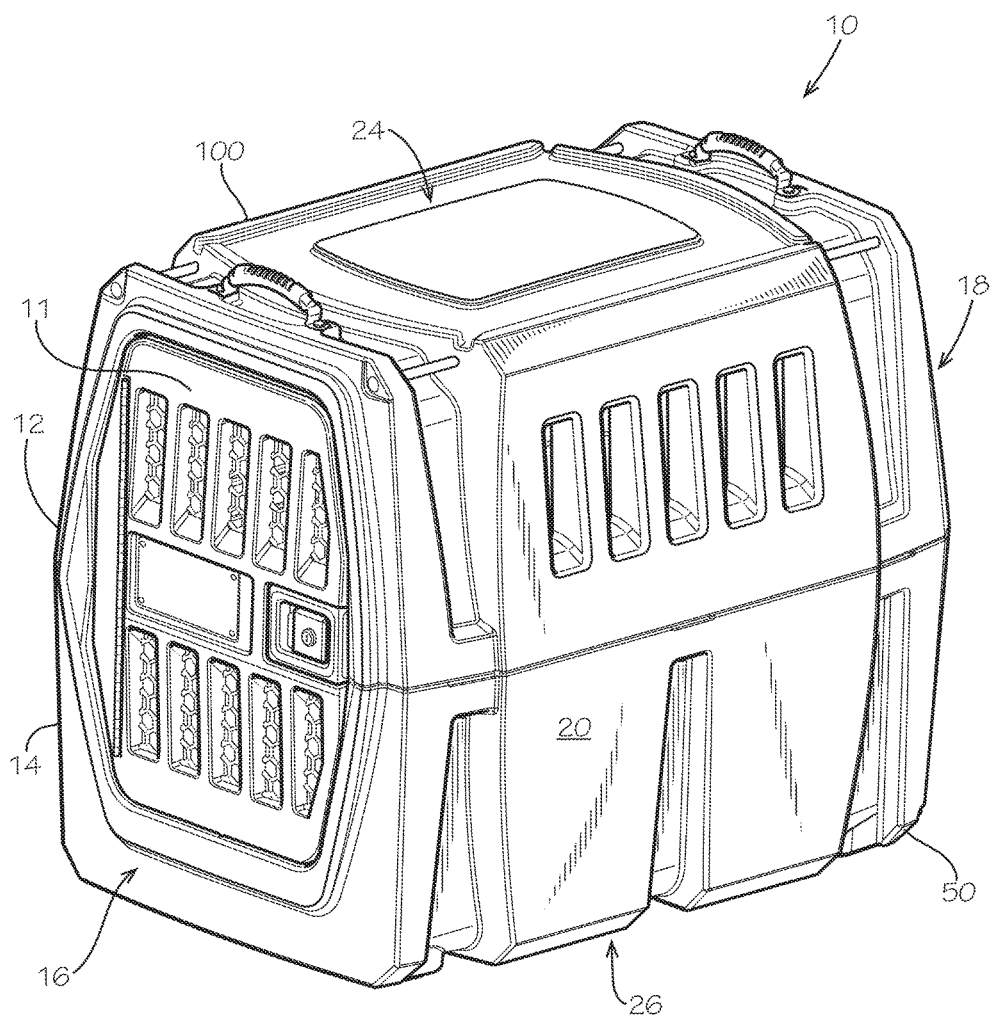
FIG. 1 is a perspective view of an embodiment of an animal enclosure.

While the making and using of various embodiments of the present invention are discussed in detail below, it should be appreciated that the present invention provides many applicable inventive concepts that are embodied in a wide variety of specific contexts. The specific embodiments discussed herein are merely illustrative of specific ways to make and use the invention and do not delimit the scope of the invention. Those of ordinary skill in the art will recognize numerous equivalents to the specific apparatus and methods described herein. Such equivalents are considered to be within the scope of this invention and are covered by the claims.

In the drawings, not all reference numbers are included in each drawing, for the sake of clarity. In addition, positional terms such as "upper," "lower," "side," "top," "bottom," etc. refer to the apparatus when in the orientation shown in the drawing, or as otherwise described. A person of skill in the art will recognize that the apparatus can assume different orientations when in use.

Referring now to the drawings, FIG. 1 illustrates an embodiment of an animal enclosure 10 including a kennel body 100. Kennel body 100 in some embodiments includes a plastic molded animal crate or kennel. Kennel body 100 may include other materials in other embodiments, such as metal, wood, composite, wire, etc. Kennel body 100 includes a top side 24, a bottom side 26 opposite top side 24, a front side 16, a back side 18 opposite front side 16, a right side 20 and a left side 22 opposite right side 20. A door 11 is positioned on front side 16 to allow a user to open and close the animal enclosure 10. In some embodiments, kennel body 100 includes an upper housing member 12 and a lower housing member 14 attached to each other using one or more fasteners.

Figure 2:
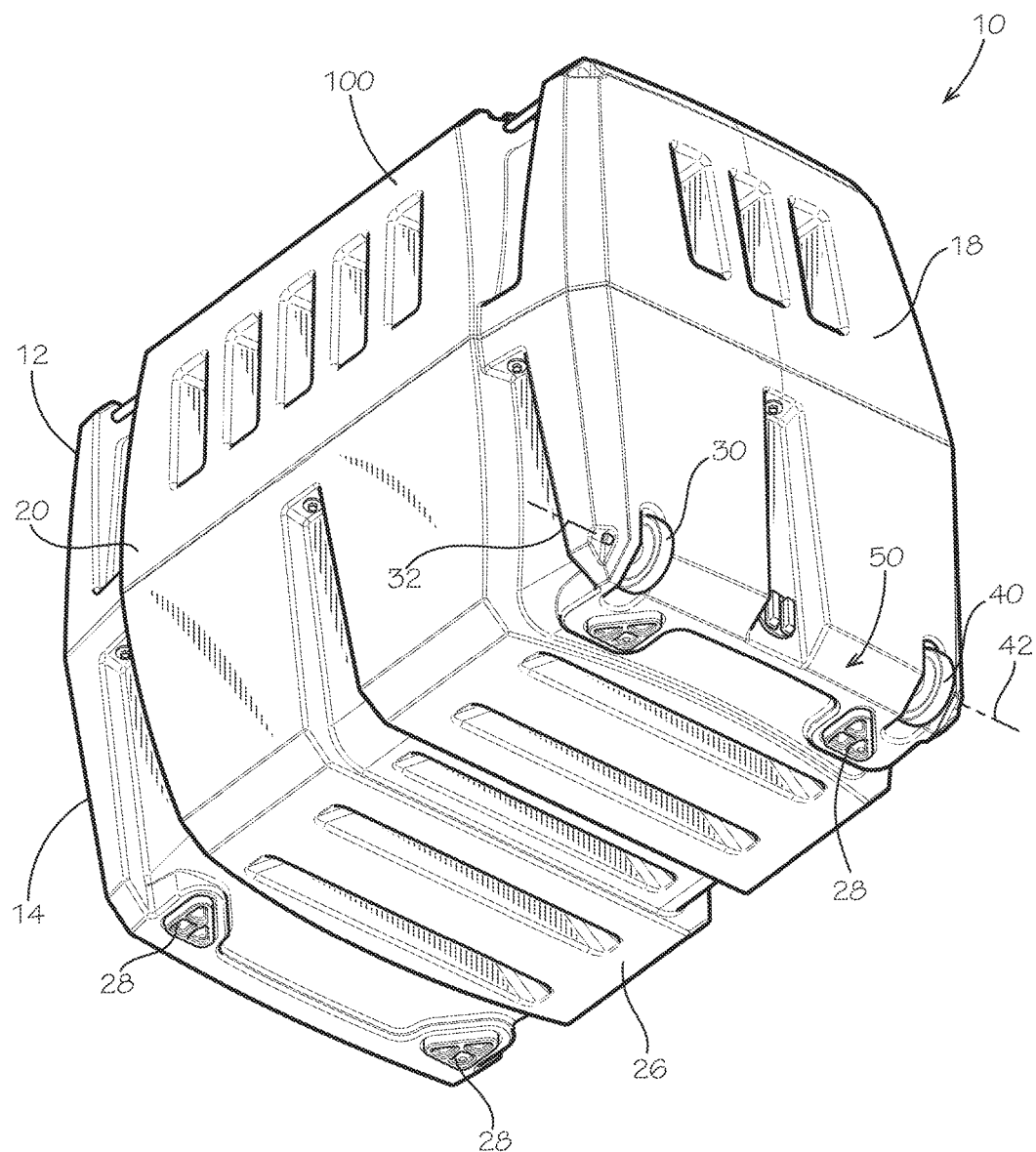
FIG. 2 is a perspective view of an embodiment of an animal enclosure.
Figure 3:
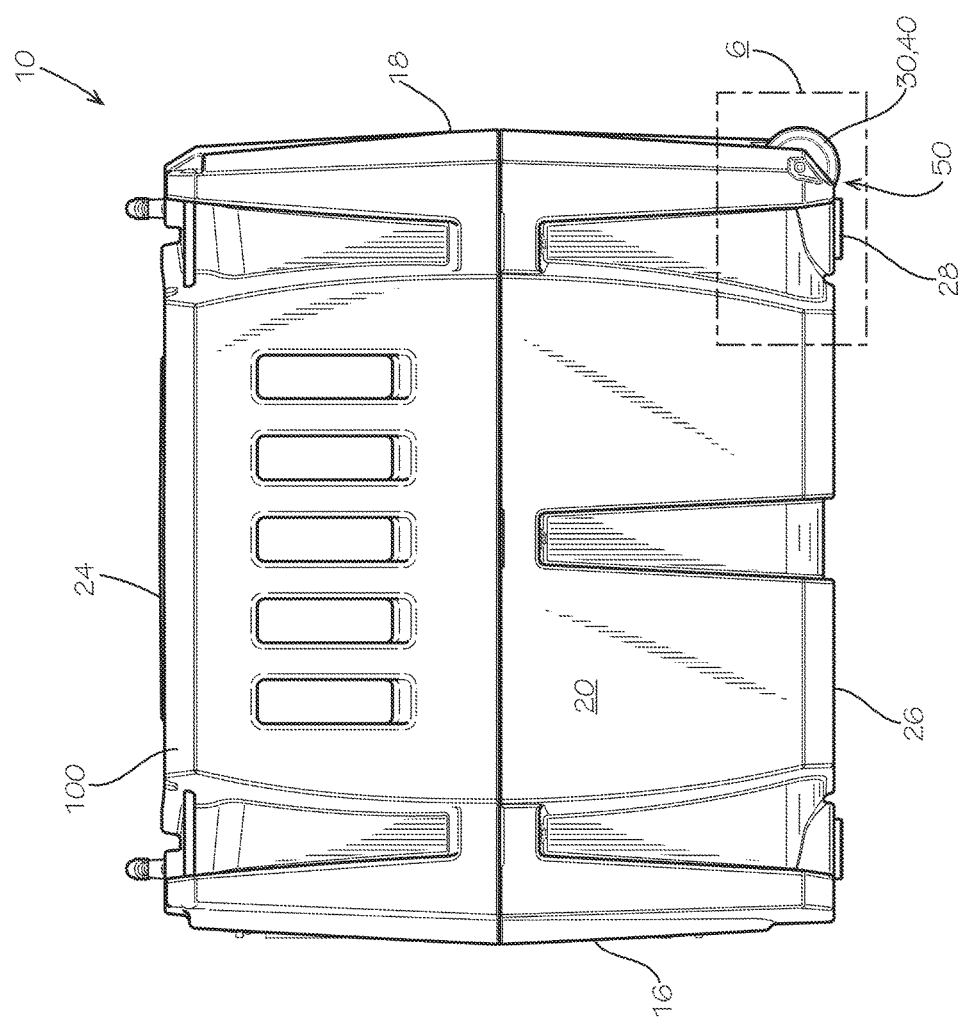
FIG. 3 is a side view of an embodiment of an animal enclosure in a rest position.

Referring to FIG. 1, in some embodiments kennel body 100 includes a lower back edge 50 positioned at the intersection between back side 18 and bottom side 26. Lower back edge 50 is generally described as the lower back edge of kennel body 100 when kennel body 100 is sitting flat against a resting surface such as a floor or the ground. A first wheel 30 is disposed on kennel body 100 in some embodiments. First wheel 30 includes a wheel that is rotatable relative to kennel body 100. Similarly, a second wheel 40 is disposed on kennel body 100 in some embodiments. Second wheel 40 includes a wheel that is rotatable relative to kennel body 100. First wheel 30 is positioned to rotate about a first wheel axis 32, and second wheel 40 is positioned to rotate about a second wheel axis 42. In some embodiments, first wheel axis 32 and second wheel axis 42 are substantially co-axially aligned, as shown in FIG. 2. First and second wheels 30, 40 are spaced relative to each other along lower back edge 50 on kennel body 100. Each of first and second wheels 30, 40 may be directly attached to kennel body 100, or indirectly attached to kennel body 100 using a mounting bracket or other intermediate structure. Also shown in FIG. 2, one or more feet 28 protrude from the bottom side 26 of kennel body 100. Each foot 28 includes a rubber traction pad in some embodiments. Each foot 28 generally provides a slight spacing between the bottom side 26 of kennel body 100 and a resting surface such as a floor or ground when the animal enclosure 10 is positioned against the resting surface. As seen in FIG. 3, first and second wheels 30, 40 are positioned on kennel body 100 generally at the lower back edge 50 between back side 18 and bottom side 26 in some embodiments. In other embodiments, the present invention could include first and second wheels 30, 40 positioned at other locations on kennel body 100, such as protruding only from back side 18, or protruding only from bottom side 26.

Figure 4:
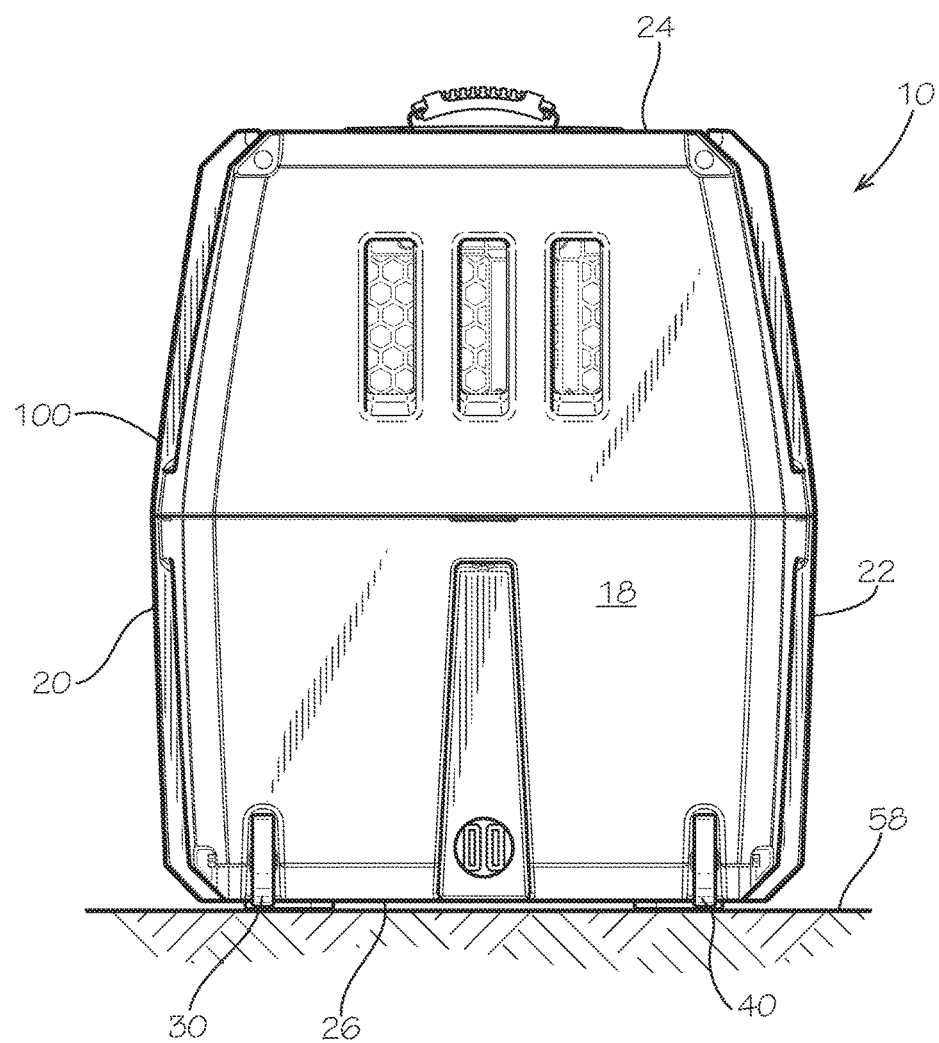
FIG. 4 is a back view of an embodiment of an animal enclosure.
Figure 5:
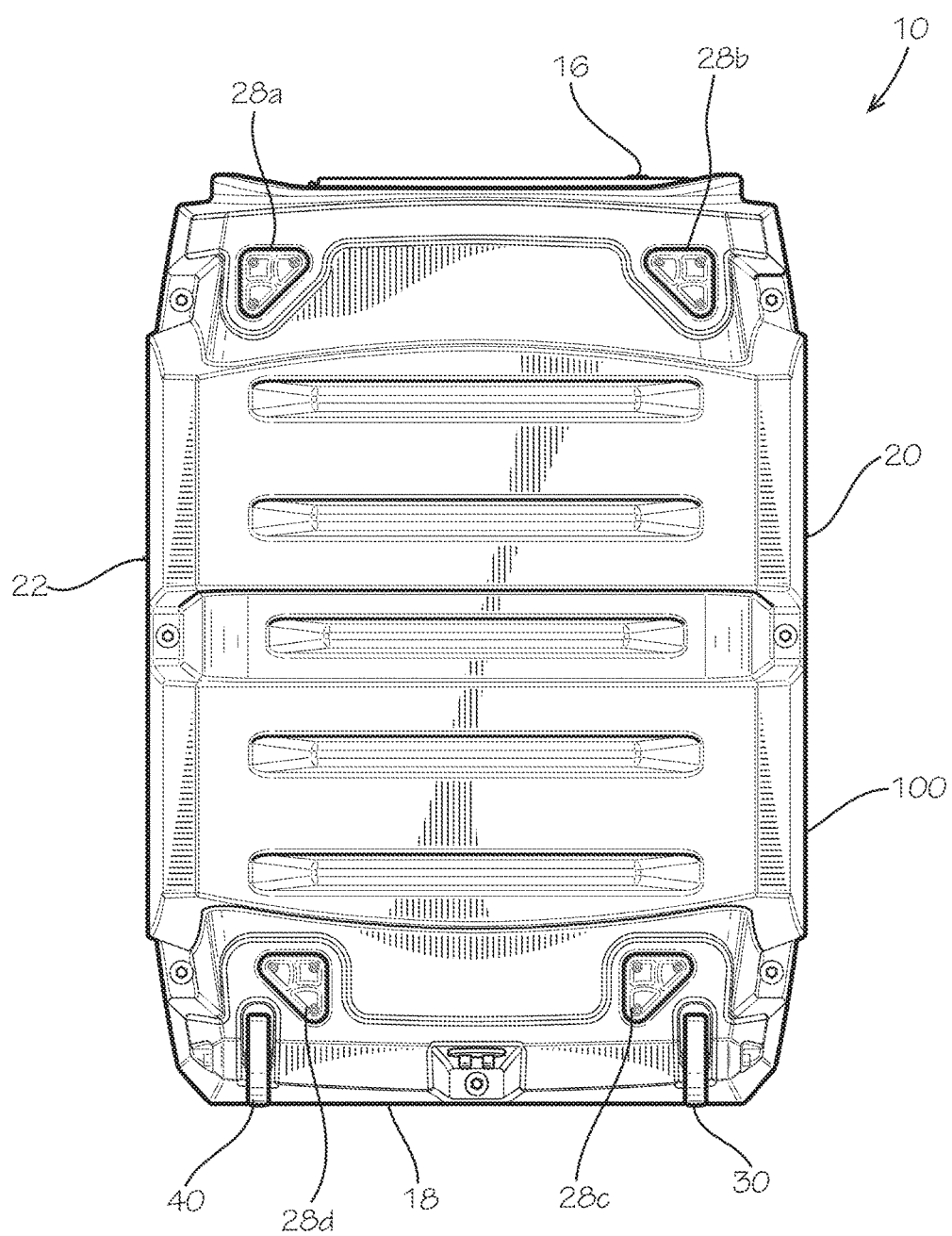
FIG. 5 is a bottom view of an embodiment of an animal enclosure.

Referring further to FIG. 4 and FIG. 5, first and second wheels 30, 40 are positioned on kennel body 100 in spaced relation to each other. First and second wheels 30, 40 have outer edges that protrude slightly from back side 18 of kennel body 100. First wheel 30 is positioned nearer right side 20, and second wheel 40 is positioned nearer left side 22 of kennel body. Right side 20 of kennel body is identified as such because it is on the right hand side of the kennel body 100 when looking at the door 11 from front side 16. Similarly left side 22 is identified as such because it is on the left hand side of the kennel body 100 when looking at the door 11 from front side 16.

Figure 6:
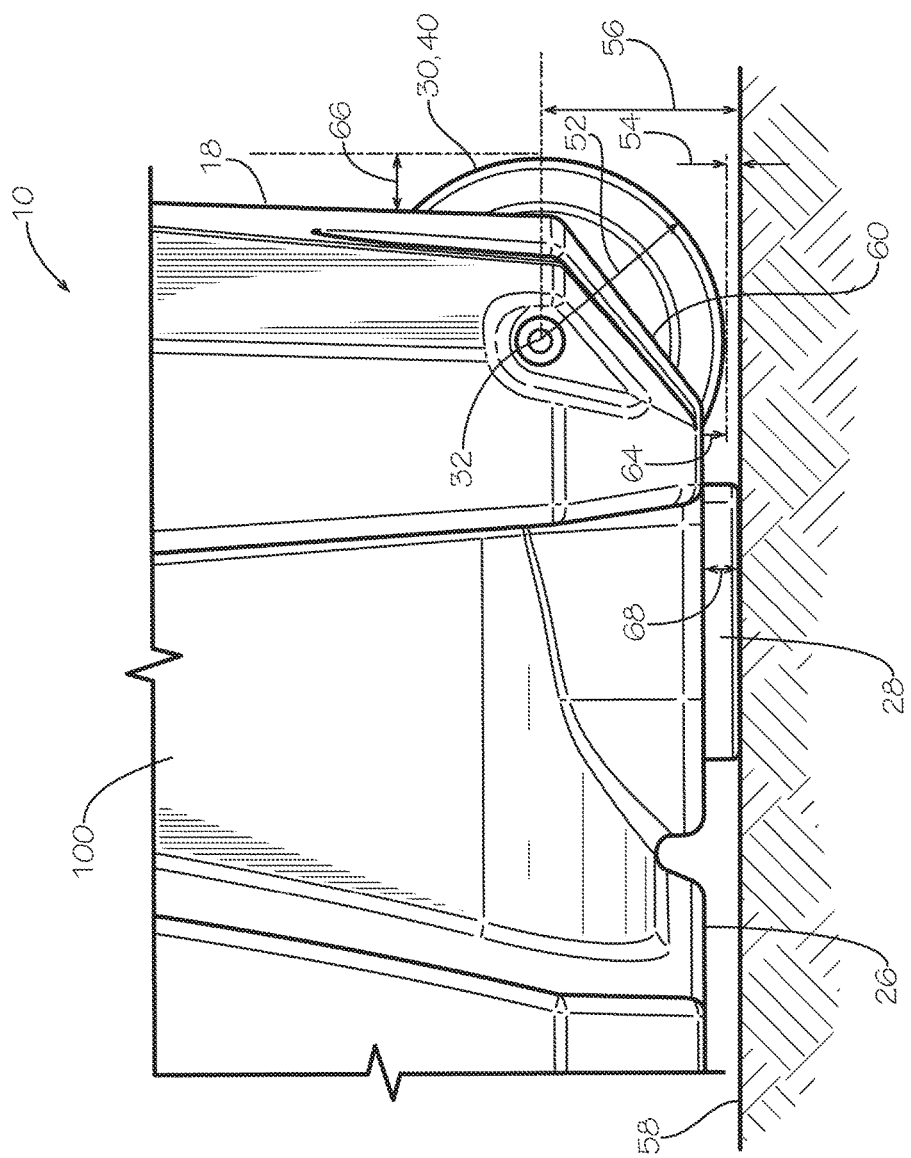
FIG. 6 is a detail side view of an embodiment of an animal enclosure in a rest position.

A detail view of an embodiment of an animal enclosure 10 is shown in FIG. 6, showing a view of Section 6 from FIG. 3. Animal enclosure 10 includes a foot 28 positioned on bottom side 26 of kennel body 100. Foot 28 projects from the bottom surface on kennel body 100, and generally engages a resting surface 58 such as the ground on which animal enclosure 10 sits. As such, foot 28 elevates the bottom side 26 of kennel body 100 above the resting surface 58 by a bottom height 68. Bottom height 68 generally corresponds to the thickness of foot 28. Resting surface 58 is substantially flat in some embodiments.

Referring further to FIG. 6, when the apparatus is positioned on a substantially flat resting surface 58 in some embodiments, the first and second wheels 30, 40 do not contact the resting surface. As such, the apparatus may be positioned on a resting surface and may remain in place on the resting surface due to the weight of the apparatus. Feet 28 also assist to keep the apparatus in a desired location on a resting surface 58 as the feet 28 provide traction in some embodiments. Feet 28 protrude from bottom side 26 of kennel body a distance equal to bottom height 68 in some embodiments. Each foot 28 is secured to kennel body using one or more fasteners, an adhesive, a mechanical engagement or another suitable mode of attachment. First and second wheels 30, 40 extend in the downward direction a bottom wheel distance 64, as seen in FIG. 6 in some embodiments. In some embodiments, the bottom wheel distance 64 is less than the bottom height 68 such that the first and second wheels 30, 40 do not contact resting surface 58 when the apparatus is positioned on a substantially flat or level resting surface 58.

Referring further to FIG. 6, in some embodiments first and second wheels 30, 40 each include a wheel radius 52. First wheel 30 includes a first wheel radius, and second wheel 40 includes a second wheel radius 40. First wheel radius and second wheel radius are substantially equal in some embodiments. As seen in FIG. 6, in some embodiments first wheel 30 is positioned a clearance height 54 above a flat resting surface 58 when the apparatus is positioned on flat resting surface 58 in some embodiments. Additionally, second wheel 40 is also positioned a clearance height 54 above a flat resting surface 58 when the apparatus is positioned on a flat resting surface 58 in some embodiments. A flat resting surface 58 is oriented along a flat plane spanning the lower side of all feet 28 in some embodiments.

Also shown in FIG. 6, in some embodiments, first wheel 30 is positioned to rotate about a first wheel axis 32. First wheel axis 32 is vertically offset above a flat resting surface 58 by a first wheel axis offset height 56 in some embodiments. In some embodiments, first wheel axis offset height 56 is greater than first wheel radius 52. Similarly, in some embodiments, second wheel axis 42 is vertically offset above a flat resting surface 58 by a second wheel axis offset height greater than the second wheel radius.

Figure 7:
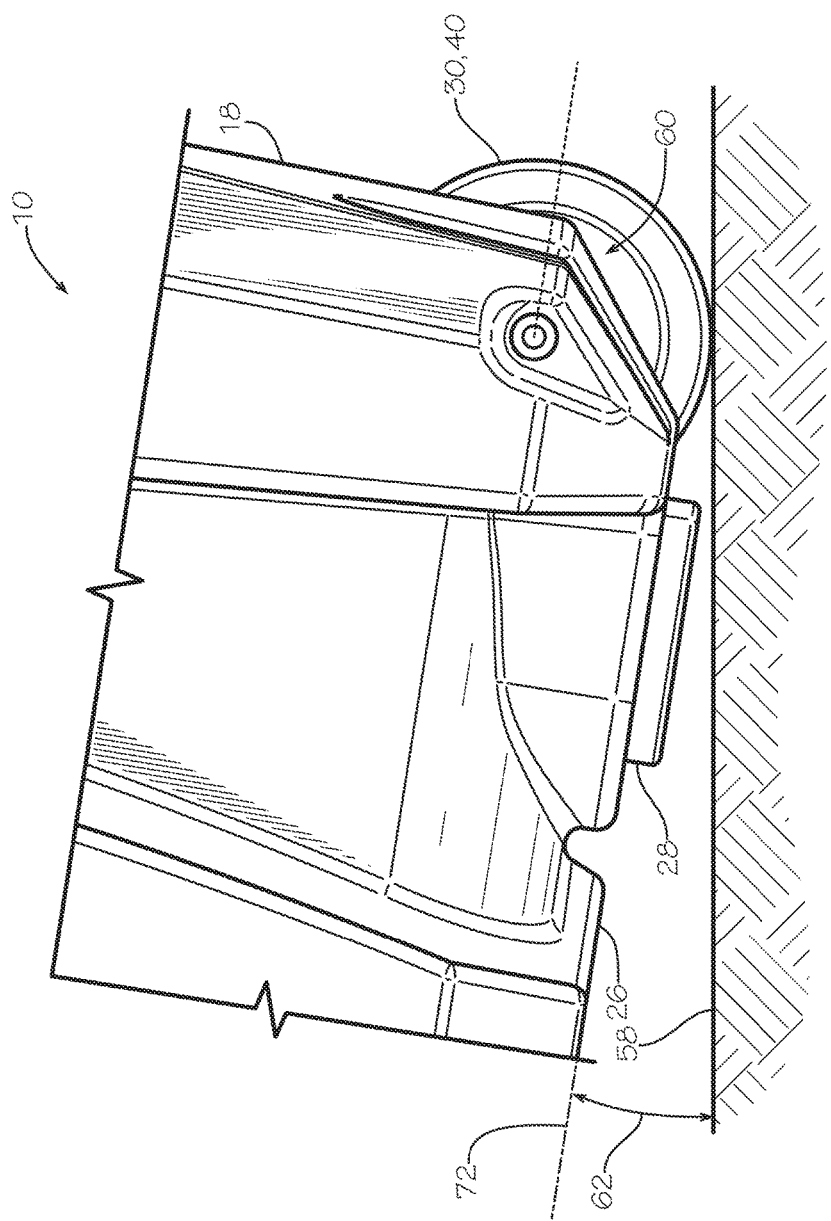
FIG. 7 is a detail side view of an embodiment of an animal enclosure.

Referring further to FIG. 6, in some embodiments, first wheel 30 extends from the back side 18 of kennel body a first wheel back distance 66. Second wheel 40 also extends from the back side 18 of kennel body a second wheel back distance in some embodiments. First wheel back distance 66 and second wheel back distance are substantially equal in some embodiments. Because first and second wheels, 30, 40 are positioned along the lower back edge of the kennel body in some embodiments, the apparatus may be moved by rolling the first and second wheels along a ground surface 58 such as a floor, a truck bed, a vehicle interior, the ground or any other surface on which the apparatus may be positioned. In some embodiments, the apparatus is rolled using first and second wheels 30, 40 by first tilting the apparatus by lifting up the front side of the kennel body as seen in FIG. 7 and in FIG. 11. By tilting the front side of the kennel body, the first and second wheels eventually engage the resting surface 58. When the front side of the kennel body is lifted, a lift angle 62 is formed between the bottom plane 72 of the bottom side 26 of the kennel body and the resting surface 58. In some embodiments, a lift angle 62 between zero degrees and ninety degrees allows first and second wheels 30, 40 to engage the resting surface 58. In additional embodiments, a lift angle 62 greater than zero and less than about forty-five degrees allows first and second wheels 30, 40 to engage resting surface 58. In further embodiments, a lift angle 62 greater than about five degrees and less than about forty-five degrees allows first and second wheels 30, 40 to engage resting surface 58.

Figure 11:
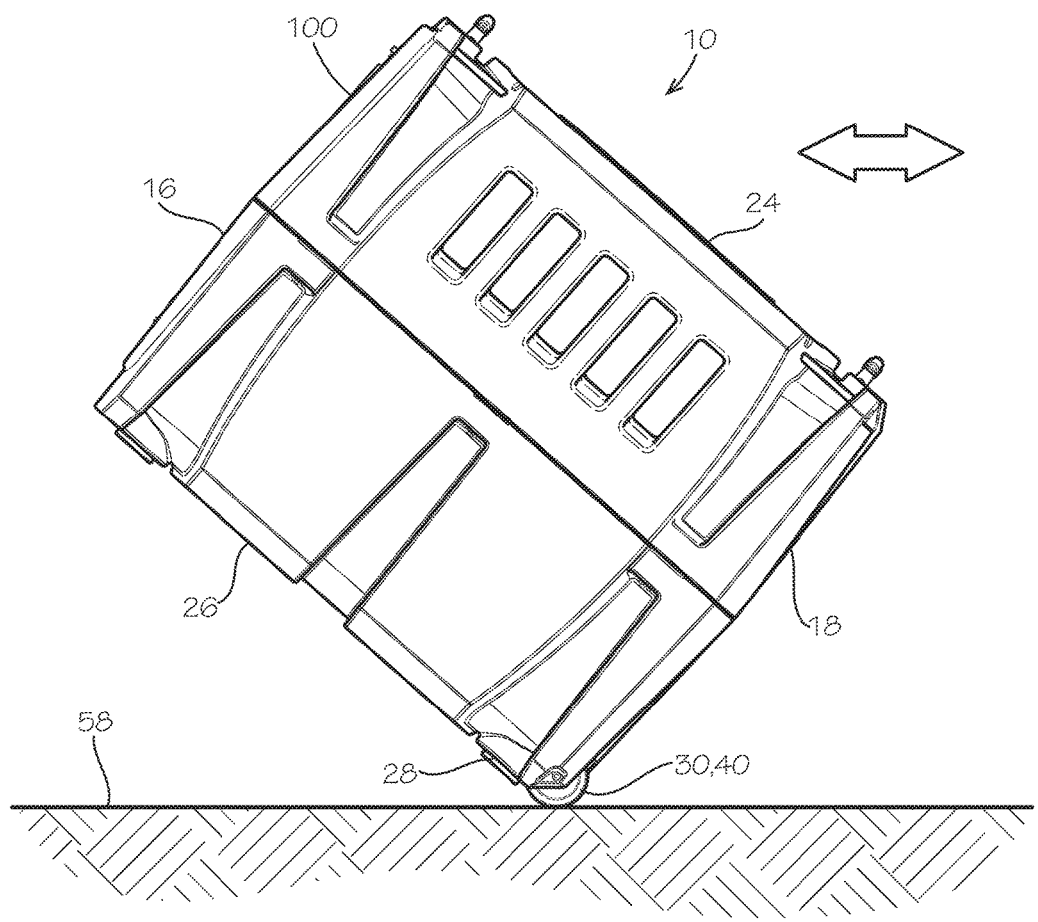
FIG. 11 is a side view of an embodiment of an animal enclosure in a tilted rolling position.

Once first and second wheels 30, 40 are engaged with a resting surface 58, the front side of the kennel body may be further lifted to provide ease of movement of the apparatus using first and second wheels 30, 40 in rolling engagement with resting surface 58, as seen in FIG. 11. As such, first and second wheels 30, 40 operate as a rolling fulcrum to support the weight of the apparatus during movement. When a user moves the apparatus to a desired location, the front side of the kennel body may be lowered to disengage the first and second wheels 30, 40 from the resting surface 58, thereby stabilizing the apparatus at a desired location. When the front side of the kennel body is lowered to disengage the first and second wheels 30, 40, the kennel body may rest on feet 28 in a slightly elevated position above the resting surface 58 due to the thickness of feet 28.

Figure 8:
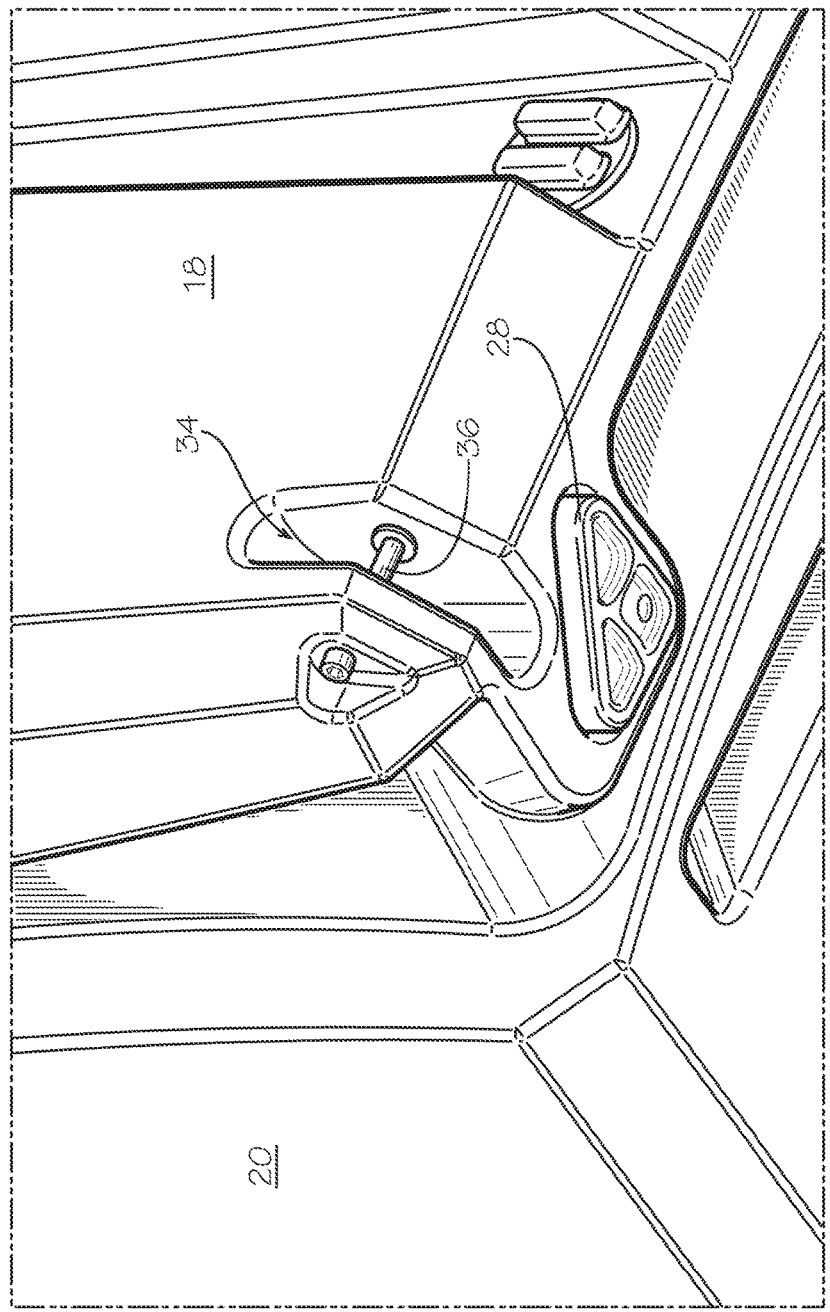
FIG. 8 is a detail bottom perspective view of an embodiment of an animal enclosure.
Figure 9:
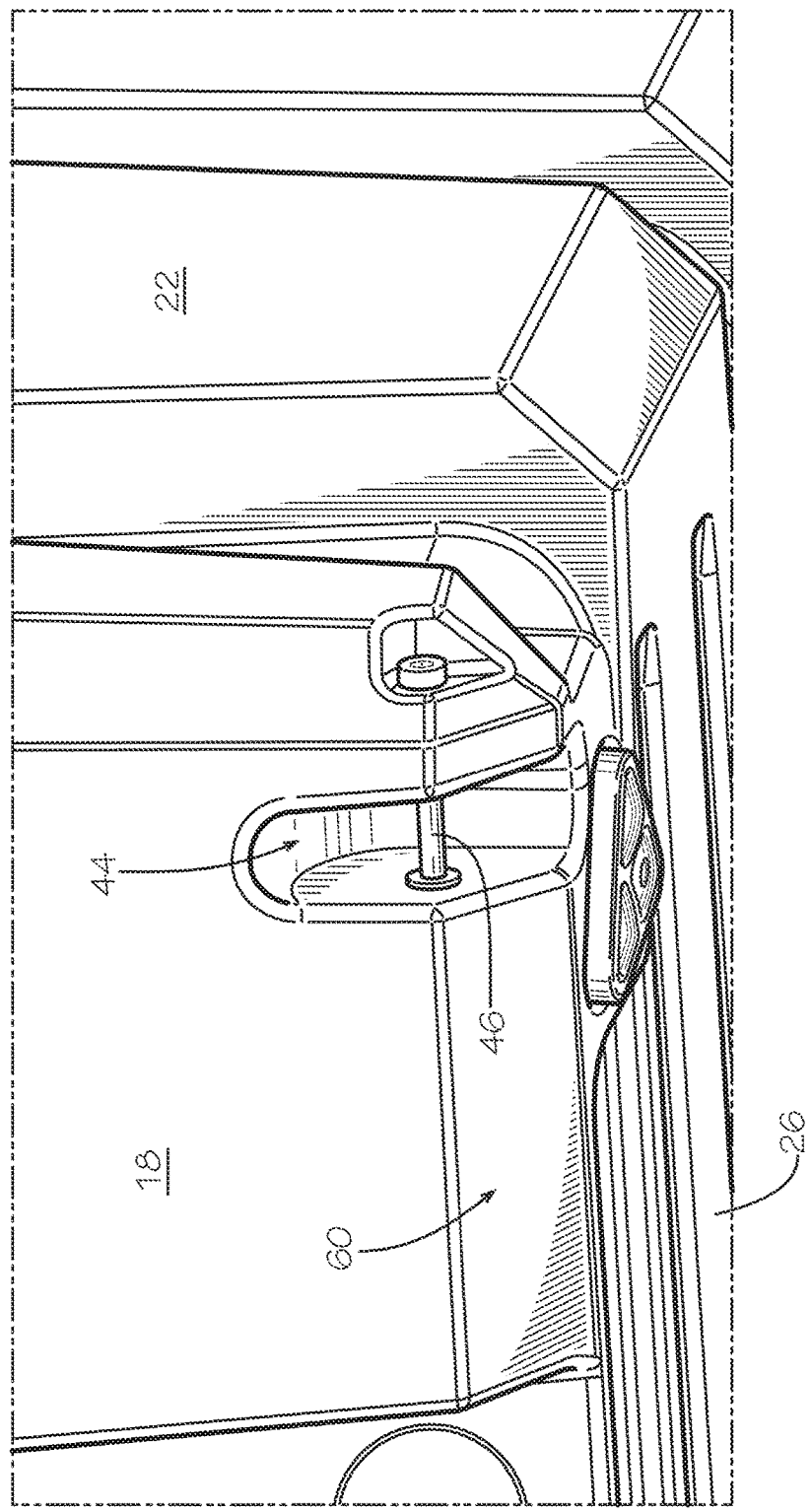
FIG. 9 is a detail bottom perspective view of an embodiment of an animal enclosure.
Figure 10:
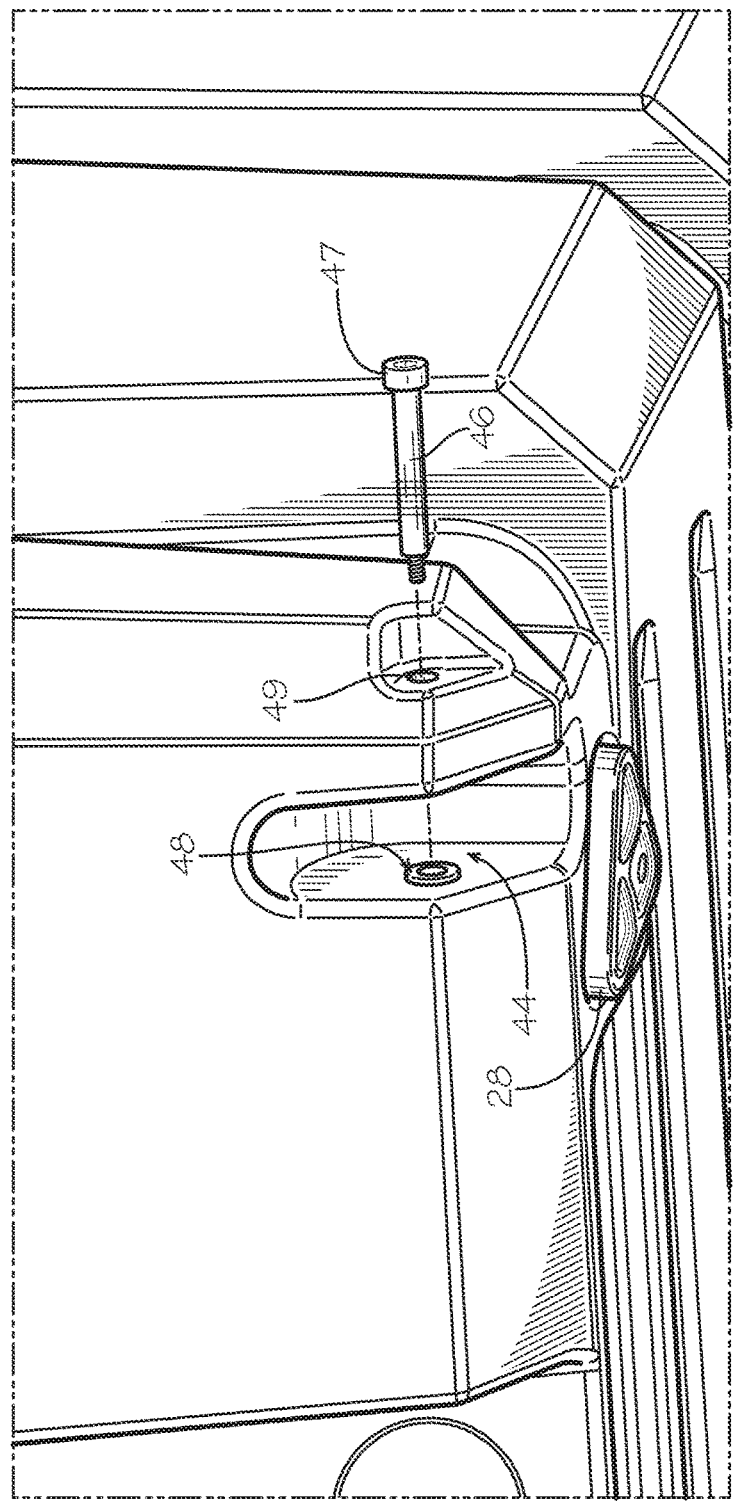
FIG. 10 is a detail bottom perspective view of an embodiment of an animal enclosure.

Referring now to FIG. 8, in some embodiments, the apparatus includes a first wheel axle 36 disposed on the kennel body. First wheel axle 36 spans a first wheel recess 34 forming a concave recession in kennel body. A portion of first wheel 30 is received in first wheel recess 34 when first wheel 30 is mounted on first wheel axle 36. Similarly, as seen in FIG. 9, a second wheel axle 46 is disposed on the kennel body in some embodiments. Second wheel axle 46 spans a second wheel recess 44 forming a concave recession in kennel body. A portion of second wheel 40 is received in second wheel recess 44 when second wheel 40 is mounted on second wheel axle 46. As seen in FIG. 10, in some embodiments, second wheel axle 46 is fitted through a second wheel axle passage 49 and extends into a second wheel axle socket 48. In some embodiments, second wheel axle socket 48 includes a threaded socket that receives a threaded end of second wheel axle 46. A second wheel axle head 47 includes a driver fitting such as a socket head cap screw or other similar fitting in various embodiments. As such, second wheel axle 46 may be fastened into place via the threaded engagement between second wheel axle socket 48 and second wheel axle 46.

Thus, although there have been described particular embodiments of the present invention of a new and useful ANIMAL ENCLOSURE, it is not intended that such references be construed as limitations upon the scope of this invention.

What is claimed is:

1. A portable animal enclosure apparatus, comprising:
a kennel body having a front side, a back side, a top side and a bottom side;
a door positioned on the front side of the kennel body;
a first wheel disposed on the kennel body positioned to rotate about a fixed first wheel axis, the first wheel having a first wheel radius, the first wheel protruding from the bottom side of the kennel body a first wheel bottom distance, and protruding from the back side a first wheel back distance;
a second wheel disposed on the kennel body positioned to rotate about a fixed second wheel axis co-axially aligned with the first wheel axis, the second wheel having a second wheel radius, the second wheel protruding from the bottom side of the kennel body a second wheel bottom distance, and protruding from the back side a second wheel back distance;
a first foot, a second foot, a third foot and a fourth foot each attached to the kennel body, each of the first, second third and fourth feet protruding from the bottom side of the kennel body a foot bottom distance;
wherein the foot bottom distance is greater than the first wheel bottom distance and the second wheel bottom distance,
wherein each of the first foot, second foot, third foot and fourth foot is dimensioned to elevate the bottom side of the kennel body a distance equal to the foot bottom distance above a reference planar flat resting surface on which the apparatus may rest,
wherein the first and second wheels are positioned a first clearance height above the flat resting surface when the kennel body is level such that the first, second, third and fourth feet engage the flat resting surface but the first and second wheels do not engage the flat resting surface, and
wherein the first and second wheels advance downwardly toward and engage the flat resting surface when the front side of the kennel body is tilted upwardly at an angle relative to the flat resting surface.

2. The apparatus of claim 1, wherein the first wheel radius and the second wheel radius are substantially equal.

3. The apparatus of claim 2, wherein each axis is positioned at the intersection of the back side and the bottom side of the kennel body.

4. The apparatus of claim 3, further comprising:
a first wheel axle disposed on the kennel body; and
a second wheel axle disposed on the kennel body.

5. The apparatus of claim 4, wherein the first wheel is rotatably mounted on the first wheel axle, and the second wheel is rotatably mounted on the second wheel axle.

6. The apparatus of claim 5, wherein each foot comprises a member attached to the bottom side of the kennel body.

\* \* \* \* \*